United States Patent
Davis

(10) Patent No.: US 9,824,042 B2
(45) Date of Patent: Nov. 21, 2017

(54) READING DATA FROM STORAGE VIA A PCI EXPRESS FABRIC HAVING A FULLY-CONNECTED MESH TOPOLOGY

(71) Applicant: EMC Corporation, Hopkinton, MA (US)

(72) Inventor: Jeffrey Benjamin Davis, Foster City, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 14/673,103

(22) Filed: Mar. 30, 2015

(65) Prior Publication Data
US 2016/0292099 A1 Oct. 6, 2016

(51) Int. Cl.
*G06F 13/28* (2006.01)
*G06F 13/42* (2006.01)
*G06F 13/40* (2006.01)

(52) U.S. Cl.
CPC .......... *G06F 13/28* (2013.01); *G06F 13/4022* (2013.01); *G06F 13/4221* (2013.01)

(58) Field of Classification Search
None
See application file for complete search history.

(56) References Cited

U.S. PATENT DOCUMENTS

2014/0032697 A1\* 1/2014 Shapiro ............. G06F 15/17331
709/212

\* cited by examiner

*Primary Examiner* — Farley Abad
*Assistant Examiner* — Dayton Lewis-Taylor
(74) *Attorney, Agent, or Firm* — Blakely, Sokoloff, Taylor & Zafman LLP

(57) ABSTRACT

A method for reading data from a persistent storage module ("PSM") in a communication fabric is discussed. A read request may be submitted to a PSM via a processor. In response, the requested data may be written to the client. A read complete may follow the same path as the data through the communication fabric.

13 Claims, 3 Drawing Sheets

READING DATA FROM STORAGE VIA A PCI EXPRESS FABRIC HAVING A FULLY-CONNECTED MESH TOPOLOGY

CROSS-REFERENCE TO RELATED APPLICATIONS

This application is related to co-pending U.S. patent application Ser. No. 14/224,846 for PCI EXPRESS FABRIC ROUTING FOR A FULLY-CONNECTED MESH TOPOLOGY, and U.S. patent application Ser. No. 14/673,073, filed Mar. 30, 2015 for WRITING DATA TO STORAGE VIA A PCI EXPRESS FABRIC HAVING A FULLY-CONNECTED MESH TOPOLOGY, filed concurrently herewith, which are incorporated herein by reference for all purposes.

FIELD OF THE INVENTION

This invention relates generally to PCIe fabric routing, and more particularly to systems and methods for reading data from an endpoint in a PCIe fabric having a fully-connected mesh topology.

BACKGROUND

In order for two systems to enable two independent systems to communicate, each of the systems needs to include sufficient hardware and/or software to enable the two systems to interface.

Other aspects of the invention will be apparent from the following description and the appended claims.

DETAILED DESCRIPTION

Figure 1:
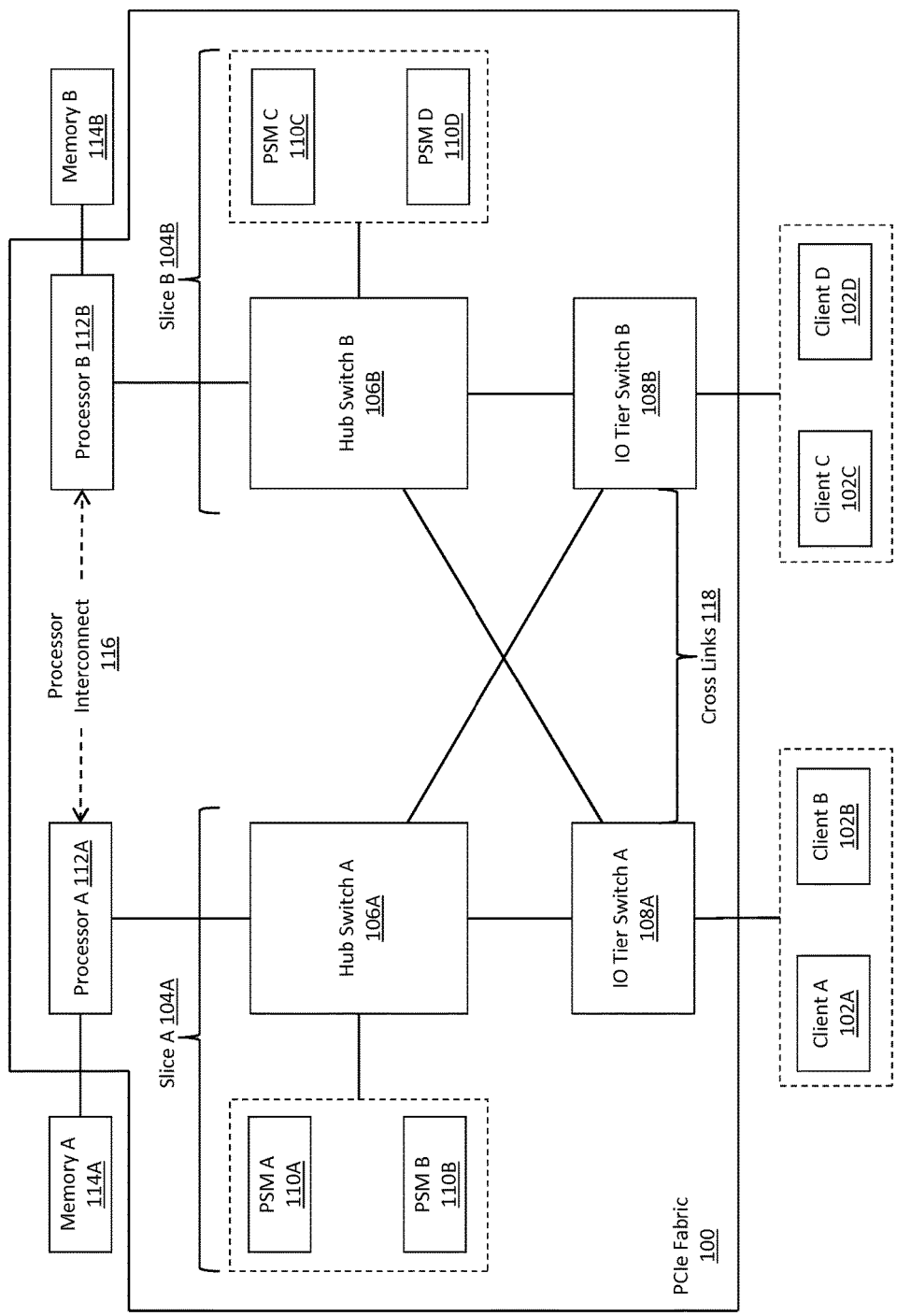
FIG. 1 shows a system that includes a PCIe Fabric in accordance with one or more embodiments of the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

In general, embodiments of the invention relate to a PCIe fabric that includes at least two tiers of switches connected to form a fully-connected mesh topology between the at least two tiers. Further, embodiments of the invention relate to a PCIe fabric that enables clients connected to one slice in the PCIe fabric to perform operations (e.g., read and write operations) on memory, network endpoint devices, and/or persistent storage in a different slice of the PCIe fabric.

In a typical communication fabric (such as Ethernet or Infiniband), requests are routed across switches in the communication fabric by associating a unique endpoint address with each endpoint device, and specifying the endpoint address as part of the request. In a PCIe fabric, read and write request operations are routed between fabric switches based on the memory address being accessed, rather than an endpoint address. As a result, the typical arrangement of address-based routing for a fully-connected mesh does not permit all clients to access all endpoint devices. One or more embodiments of the invention provide a mechanism by which this limitation can be overcome. Specifically, address-based routing may be used to achieve a fully-connected mesh between the tiers (described below) with all clients accessing all endpoints.

In one or more embodiments of the invention, the components in the PCIe fabric communicate and/or implement that Peripheral Component Interconnect Express (PCIe) standard. Embodiments of the invention are not limited to any past, current or future version of the PCIe standard. Further, embodiments of the invention may be implemented with other standards that implement features that are similar to the features of the PCIe standard that are used to implement various embodiments of the invention.

The present disclosure further addresses methods and processes for performing I/O operations over the PCIe fabric. Since multiple paths exist through the fabric, race conditions may occur when a client tries to read or write data. For example, a client may receive a "read complete" indication before the data is fully transferred to the client. Similarly, a write race condition may exist where the PSM and/or client receives a "write complete" indication before the data is fully written to the PSM or other endpoint. This problem may be exacerbated when data is being written or read from multiple PSMs. As discussed herein, these race conditions may be avoided by forcing certain system transmissions to follow the same communication path through the PCIe fabric as the data.

FIG. 1 shows a system that includes a PCIe Fabric in accordance with one or more embodiments of the invention.

The PCIe Fabric (100) is made up of two or more slices (104A, 104B), where each of the slices is directly connected to a processor (112A, 112B) and one or more clients (102A-102D). Each of the aforementioned components is described below.

In one embodiment of the invention, each client (102A-102D) is a physical device that includes a processor (or another type of processing component), memory, and a physical interface(s) to enable it to connect to the PCIe fabric (100). Further, each client includes functionality to implement the PCIe standard (or portions thereof) that are required to implement one or more embodiments of the invention. The clients also include functionality to send and/or receive transaction layer packets (TLP). A TLP corresponds to a type of packet that is defined in accordance with the PCIe standard. In one embodiment of the invention, the TLPs enable clients to read data from the PCIe fabric and write data to the PCIe fabric. Said another way, the TLPs enable clients to transfer data to and from locations in the PCIe fabric. In one embodiment of the invention, one or more of the clients operates as a PCIe endpoint, i.e., a device that originates a transaction and/or a device that is the target of the transaction. Each of the clients may be connected to PCIe fabric via a link, i.e., physical connection between the client and the PCIe fabric.

Continuing with the discussion of FIG. 1, each slice (104A, 104B) includes an Input/Output (IO) tier switch (ITS) (108A, 108B), a hub tier switch (HTS) (106A, 106B), and one or more persistent storage modules (PSMs). Each of these components is described below.

With respect to the ITS, each ITS is a physical PCIe switch that is connected to one or more clients (102A-102D). Each ITS is also connected to a HTS in the same slice in which the ITS is located. In addition, each ITS may be connected to one or more HTSes in different slices than the one in which the ITS is located. In one embodiment of the invention, each ITS is connected to every HTS in the PCI fabric resulting in a fully connected mesh between the tiers in the PCIe fabric. Embodiments of the invention may be implemented without a fully connected mesh between the tiers without departing from the invention.

In one embodiment of the invention, each ITS is configured to: (i) receive TLPs from the clients with which it is connected and route the TLPs to the appropriate egress port (either the upstream port or one of the downstream ports) on the ITS using address routing, such as memory address routing, and (ii) receive TLPs from one or more HTSes to which the ITS is connected and route the TLPs to the appropriate egress port (typically a downstream port) on the ITS using address routing. For example, in FIG. 1, ITS B (108B) may receive TLPs from Client C (102A), Client D (102D), HTS A (106A), and HTS B (106B).

With respect to the HTS, each HTS is a physical PCIe switch that is connected to one or more ITSes (108A-108B) and to one or more persistent storage modules (PSMs) (110A-110D). Each HTS is connected to an ITS in the same slice in which the HTS is located. In addition, each HTS may be connected to zero or more ITSes in different slices than the one in which the HTS is located. In one embodiment of the invention, each HTS is connected to every other ITS in the PCIe fabric resulting in a fully connected mesh between the tiers in the PCIe fabric. Each HTS may also be connected to a processor via its root port (not shown). Embodiments of the invention may be implemented without a fully-connected mesh between the tiers without departing from the invention.

In one embodiment of the invention, each HTS is configured to: (i) receive TLPs from the persistent storage modules (PSM) with which it is connected and route the TLPs to the appropriate egress port (typically a downstream port) on the HTS using address routing and (ii) receive TLPs from one or more ITSes to which the HTS is connected and route the TLPs to the appropriate egress port (either the upstream port and/or one or more of the downstream ports) on the HTS using address routing. For example, in FIG. 1, HTS B (106B) may receive TLPs from PSM C (110C), PSM D (110D), ITS A (108A), and ITS B (108B). Additional details about the HTS are provided below with respect to FIG. 3.

In one embodiment of the invention, each of the persistent storage modules (100A-110D) includes persistent storage (not shown) and, optionally, volatile memory (not shown) (e.g., Dynamic Random-Access Memory (DRAM), Synchronous DRAM, SDR SDRAM, and DDR SDRAM). The persistent storage may include, but is not limited to, NAND Flash memory, NOR Flash memory, Magnetic RAM Memory (MRAM), Spin Torque Magnetic RAM Memory (ST-MRAM), Phase Change Memory (PCM), memristive memory, any other memory defined as non-volatile Storage Class Memory (SCM), magnetic disks, and optical disks. Those skilled in the art will appreciate that embodiments of the invention are not limited to storage class memory. In one embodiment of the invention, each of the PSMs is part of only one slice.

Continuing the discussion of the PCIe fabric, as discussed above, each slice in the PCIe fabric is directly connected to at least one processor (112A, 112B). Each processor is a group of electronic circuits with a single core that is configured to execute instructions or multiple cores that are configured to execute instructions. The processor may be implemented using a Complex Instruction Set (CISC) Architecture or a Reduced Instruction Set (RISC) Architecture. In one or more embodiments of the invention, the processor includes a root complex (as defined by the PCIe standard) (not shown). The root complex connects the processor to at least one slice and to memory (114A, 114B) (e.g., Dynamic Random-Access Memory (DRAM), Synchronous DRAM, SDR SDRAM, and DDR SDRAM) that is accessible via the PCIe fabric but that is not part of any slice in the PCIe fabric.

In one embodiment of the invention, processors (112A, 112B) within the PCIe fabric are able to directly communicate using, for example, a processor interconnect (116) such as Intel QuickPath Interconnect, Intel Front Side Bus, or AMD HyperTransport. Those skilled in the art will appreciate that other point-to-point communication mechanisms may be used to permit direct communication between the processors (112A, 112B) without departing from the invention.

The invention is not limited to the system shown in FIG. 1.

While the FIG. 1 shows clients connected to the ITSes and PSMs connected to the HTSes, embodiments of the invention may be implemented such that clients are connected to the HTSes and PSMes are connected to the ITSes.

In another embodiment of the invention, the PCIe fabric may be implemented such that it does not include any PSMs; rather, both the ITSes and the HTSes are connected to separate sets of clients, wherein the PCIe fabric facilitates communication between the clients.

Further, while the PCIe fabric shown in FIG. 1 only includes two slices, two processors, and four PSMs, PCIe fabrics may be implemented with a fewer or greater number of each of the aforementioned components without departing from the invention. In addition, while the PCIe fabric in FIG. 1 is connected to four clients and two memories, embodiments of the invention may be implemented to enable the PCIe fabric to connect with a fewer or greater number of clients and/or memories without departing from the invention.

Further, while embodiments of the invention have been described with respect to a PCIe fabric that includes storage (e.g., PSM (110A-110D), embodiments of the invention may be implemented to enable any two devices to communicate using the PCIe fabric. For example, in one embodiment of the invention, the clients shown in FIG. 1 may be blade servers, where the blade servers do not include any physical NIC cards and PSMs may be replaced with network endpoint devices.

In this example, network endpoint devices are devices that are configured to interface with both a network (i.e., a wired network, a wireless network or a combination thereof) using a networking protocol and with the PCIe fabric via PCIe. An example of network endpoint device is a PICe NIC card. The network endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory).

Continuing with the example, the PCIe fabric would enable the blade servers to communicate with one or more network endpoint devices. This embodiment would allow the blade servers to efficiently share one or more network endpoint devices. The invention is not limited to this example.

In another example, in one or more embodiments of the invention, the PSMs may be replaced with storage endpoint devices (i.e., devices that include functionality to store data and service read and write requests from clients). The storage endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory). An example of the storage endpoint device is a storage appliance. The invention is not limited to this example.

Further, embodiments of the invention may be extended to cover two or more devices communicating via a PCIe fabric. In the general case, the PSM (shown in FIG. 1) may be generalized to a target device, where the target device may include the PSM, a network endpoint device, a storage endpoint device, or any other device capable of communicating using PCIe.

While the PCIe Fabric in FIG. 1 has been shown as including the PSMs (or more generally target devices), the PCIe Fabric may be implemented such that it does not include the target devices; rather, the PCIe Fabric only include the necessary physical components to connect to the target devices.

Figure 2:
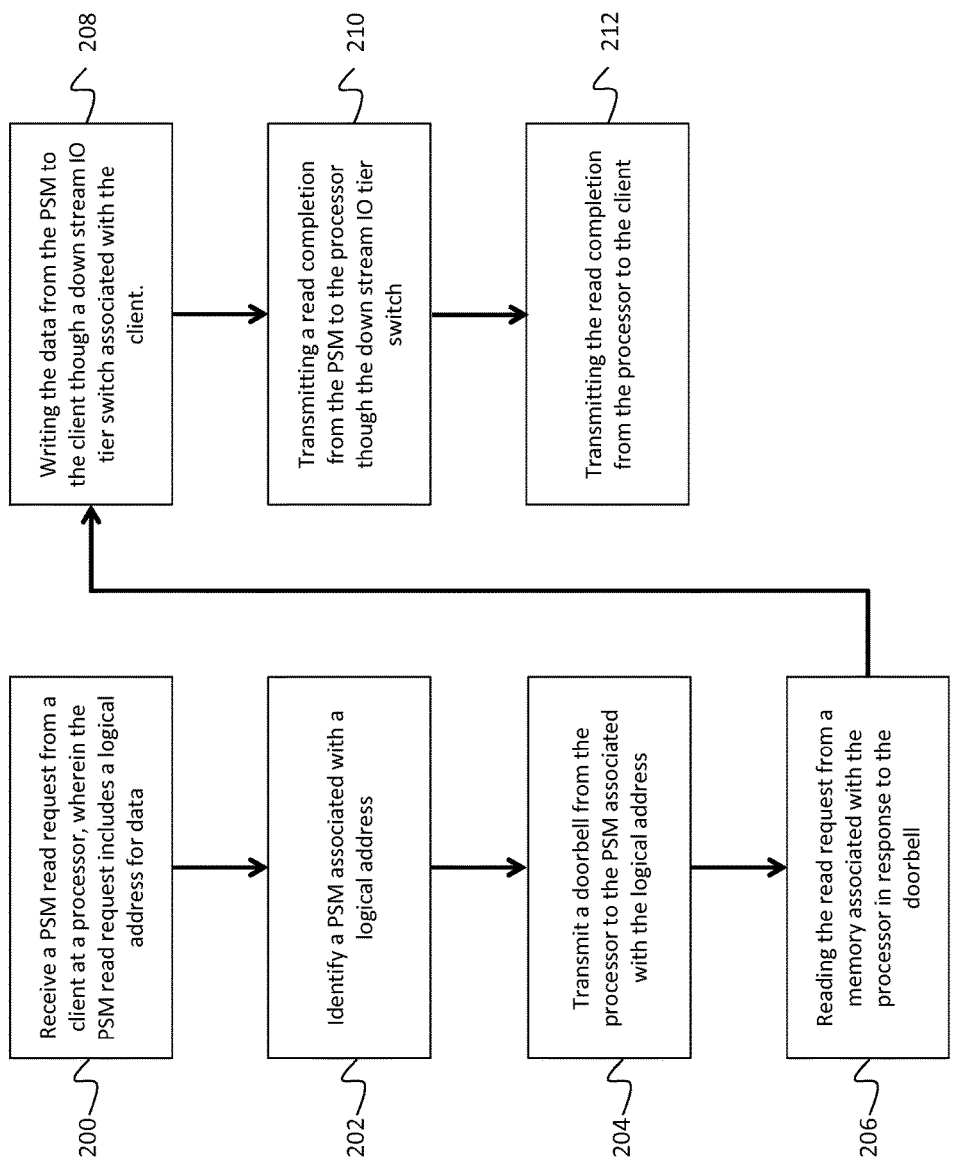
FIG. 2 depicts a method for reading data consistent with an embodiment of the present disclosure

Turning now to FIG. 2, a process is discussed for reading data from a PSM in a system similar to FIG. 1. This read request may be received at a processor, such as processor A or processor B (112A, 112B), from a client, such as clients (102A-D). The request may be for data residing on one or more PSMs in the system, such as PSMs (110A-D). In some embodiments, the requests and all other transmissions may be transmitted through the system using multicasting, as discussed in the cross-referenced patent documents. In some embodiments, the transmissions may be routed through the system using TLPs, as discussed above.

In an embodiment, data may be read from one or more PSMs and transmitted back to the client. For example, data may be read from PSM A (110A) and transmitted to Client C (102C) in response to a read request from that client. Once the data is read from the PSM, PSM A may send a completion to the processor, such as processor A (112A) and/or processor B (112B), which may in turn transmit a read complete to the client, in this case client C. This read completion may indicate to the client that the data has been transmitted from the PSM and no more data is expected. There is a possibility, however, that the read completion will be received by the client while the data is still in flight (i.e. while it is still being transmitted through the PCIe fabric from the PSM). For example, the data may flow through hub switch A (106A) and IO tier switch B (108B) before arriving at client C (102C). The read complete from the PSM, however, may flow up to processor A (112A) and/or processor B (112B) before being transmitted down through hub switch B (106B) and IO tier switch B (108B). If there is latency on the wire, such as at cross links (118), the read complete may arrive at client C (102C) before any or all of the data. The client may therefore believe it has all of the read data, while some of it is actually still flowing through the fabric. The method depicted in FIG. 2 resolves this race condition.

At block 200, a PSM read request may be received from a client at a processor. For example, client C (102C) may send the read request through IO tier switch B (108B) and hub switch B (106B) to processor B (112B). In an embodiment, the PSM read request may include logical address for data the client wishes to read.

At block 202, the processor, such as processor B (112B) may identify a PSM associated with the logical address provided by the client. In some embodiments, the processor may consult an in-memory data structure to resolve the logical address to a physical address. The in-memory data structure may be a logical-to-physical address mapping residing in a processor memory, such as memory A (114A) or memory B (114B). The identified physical address may correspond to one or more locations of the data in the system. For example, the physical address may identify one or more regions in one or more PSM's that contain all or a portion of the data.

At block 204, a doorbell may be transmitted from the processor to the one or more of the physical locations. For example, the doorbell may be transmitted to PSM A (110A). In some embodiments, the doorbell may be transmitted to multiple PSM's, which may be on the same slice or different slices. For example, a doorbell may be transmitted to PSM A (110A) on slice A (104A) and PSM D (110D) on slice B (104B). This may be beneficial, for example, if portions of the requested data reside on different PSM's.

In response to the doorbell, the one or more PSM's may read the physical location data from the processor memory at 206. In some embodiments, reading the physical location data comprises a DMA read request. The read request may include the address information the PSM needs to physically locate the data on the PSM.

Additional and/or alternatives processes for blocks 204 and 206 may exist. For example, a processor may directly write the read request to the PSM memory. In some embodiments, the read request may be transmitted to the PSM with a tag, such as a set bit, flag, and/or indicator, indicating it is a new request. Additionally or alternatively, a hardware and/or software FIFO queue may be implemented, where the PSM knows everything in the queue is a new request.

In some embodiments, the requested data may be located in at least one of two locations of the PSM. First, the data may be in a non-persistent PSM memory, such as a vaulted memory. Vaulted memory could be, for example, DRAM belonging to the PSM. Second, the data may be in in the PSM's memory module, such as a flash memory module, for persistent storage. In an embodiment, reading the data from the vaulted memory may provide better system performance.

Once the data is located in the PSM, it may be written to the client through a down stream IO tier switch associated with the client at block 208. For example, if the data was requested by client C (102C), it may be written to the client through IO tier switch B (108B) which is in communication with the client. If the data is read from PSM A (110A), it must also travel through hub switch A (106A) and the crosslink connecting hub switch 106A to IO tier switch B (108B).

In some embodiments, writing the data to the client comprises a DMA write. For example, the data may be written from the PSM's vaulted memory and/or memory module to the client's memory. In some embodiments this may be facilitated through a DMA engine residing on the client, in the PSM, and/or at the processor.

At block 210, a read complete indication may be transmitted from the one or more PSM's to the processor once the data is written out of the fabric. If the PSM and the client are in the same slice, the read complete indication may be transmitted directly to the processor associated with that slice. If, however, the PSM and client are in different slices, the read complete indication may be transmitted through the same downstream IO tier switch as the data. In the present example, that may be IO tier switch B (108B). Transmitting the data through the downstream IO tier switch associated with the client ensure the read complete indication does not reach the client and/or the processor before the data due to latency on a cross link. This is because the read completion is following the data along the same path, and nearly to the same endpoint, before being routed to the processor.

For example, the read complete indication may be transmitted through hub switch A (106A) and IO tier switch B (108B), following the data, before traveling upstream from IO tier switch B (108B) to hub switch B (106B), and ultimately to processor B (112B). This may be contrasted with transmitting the read complete indication directly to the processor, such as through hub switch A (106A) to processor A (112A) and over to processor B (112B). Additionally or alternatively, the read complete indicator may be transmitted to processor A (112A), which may then send the indication back down switch A (106A) and IO tier switch B (108B), following the data.

Finally, at block 212 the read complete indication may transmitted from the processor to the client. For example, once processor B (112B) has received the read complete indication from the PSM, it may transmit the indication (or similar notification) back downstream to the client. If the data was read from multiple PSMs, the processor may wait to transmit the notification until it has received a completion from all of the PSMs. For example, if data was read from both PSM A (110A) and PSM D (110D) in response to the read request, the processor may wait to transmit the read complete indication until it has received a similar indication from both PSM A (110A) and PSM D (110D). This allows the processor to ensure all the data has indeed been transmitted to the client, before telling the client that the read is complete.

Figure 3:
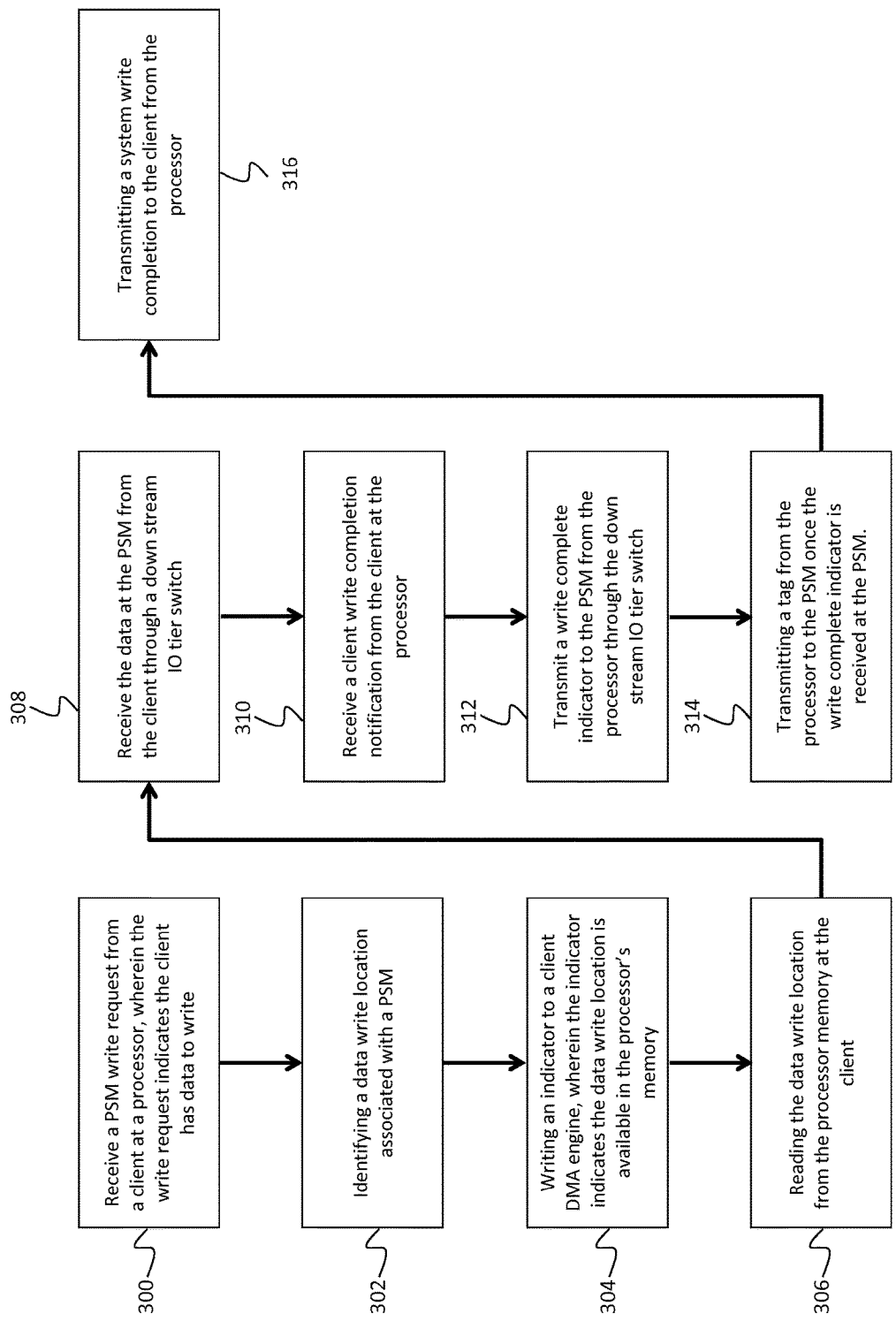
FIG. 3 shows a method for writing data consistent with an embodiment of the present disclosure.

Turning now to FIG. 3, a method for avoiding a write race condition in a PCIe fabric comprising a fully connected mesh topography is discussed. In some embodiments, the write race condition is similar to the read race condition discussed above. A client may wish to write data to one or more PSMs connected to the PCIe fabric. The client may transmit a write request to a processor, such as processor A (112A) or processor B (112B). The processor may respond with a PSM location, and the client may begin the data transfer. Once the client has written its data to the wire, it may send a write complete back to the processor. The processor may then set a doorbell at the PSM indicating that the write is complete. The PSM may then commit the data received from the client to non-persistent storage. In some embodiments, however, the doorbell may be received while the data is still in flight from the client. For example, the doorbell may follow a different path than the data, and may therefore arrive at the PSM before the data. In response, the PSM may commit any amount of received data to non-persistent storage before the remainder of the data arrives. The process depicted in FIG. 3 may prevent this race condition.

At block 300, a processor may receive a write request from a client indicating the client has data it wishes to write to a PSM. For example, processor B (112B) may receive a write request from client C (102C). In some embodiments, this write request may be received via a DMA engine residing on the client. The DMA engine may enable the client to write directly to or read from a processor memory, such as memory B (114B). Additionally or alternatively, a client processor transmit the write request to the processor. This may be beneficial for smaller packets where the overhead of using a DMA engine is not preferred.

In response to the write request, the processor may identify one or more write locations associated with one or more PSMs. For example, the processor may identify physical addresses where the data should be written. These physical addresses may be within the same PSM, or may be in multiple PSMs. In some embodiments, writing the data to multiple PSMs may provide redundancy in the event of a PSM failure. In the present example, processor B (112B) may identify PSM A (110A) as the location for the data.

At block 304, the processor may write an indicator, such as a bit, flag, or indicator, to the client DMA engine. This bit may indicate that there are one or more data write locations available in the processor's memory. This data write location may be the physical location identified in block 302. For example, the bit may notify the client that there is a PSM location available in memory (114B) of processor B (112B).

At block 306, the client may read the write location from the processor memory. This read may occur via the DMA engine residing on the client. Once the client has received the PSM location from the processor memory, it may begin writing the data to the PSM via the PCIe fabric.

At block 308, the PSM may receive the data written from the client. In an embodiment, this data may be received through a down stream IO tier switch port associated with the client. For example, the data may flow from client C (102C), through IO tier switch B (108), and up to PSM A (110A) via hub switch A (106A). In an embodiment, the data is routed through the PCIe fabric using multicast groups at each IO tier switch and/or hub switch. In an embodiment where multiple physical addresses are identified at multiple PSMs, the data may flow to two or more PSMs through a down stream IO tier switch associated with the client.

In some embodiments, data received at the PSM may be written to the PSMs vaulted memory. This vaulted memory could be, for example, DRAM or MRAM associated with the PSM. The vaulted memory may also be another form of non-volatile/persistent or non-persistent memory. The PSM may store the data in vaulted memory until it receives an indication from the processor to commit the data to long term persistent storage.

Once the client has finished writing data to the PCIe fabric, it may transmit a write complete notification to the processor. At block 310 the processor may receive this notification from the client. For example, client C (102C) may transmit a write complete notification to processor B (112B) once it has finished writing data to the fabric. This write complete notification may be transmitted and/or received while the data is still in flight to the PSM. In some embodiments, the write complete notification is a client DMA write, such as a MWr ("Memory Write") PCIe TLP.

Once the write complete is received from the client, the processor may transmit a separate write completion to any PSM that received data from the client. For example, if PSM A (110A) received data, the processor may transmit the write completion to that PSM. If multiple PSMs received data, the write completion may be sent to each.

The write completion transmitted from the processor to the PSM may flow through a down stream IO tier switch associated with the client writing the data. For example, the write completion may flow down to IO tier switch B (108B) associated with client C (102C), before traveling up a crosslink to hub switch A (106A), and over to PSM A (110A). Forcing the write completion through the IO tier switch associated with the client ensures that it follows the same path to the PSM as the data. This may prevent the race condition discussed above because the write completion will arrive behind the data rather than ahead of it.

At block 314, a data tag may be transferred from the processor to the PSM once the write completion is received. The processor may create a data tag for each physical location, and may transmit the tag to each. In an embodiment, this data tag comprises an object identifier (e.g. a logical unit identifier ("LUN")) and an offset. In an embodiment, the data tag and its constituent components may identify a location of the data. The tag may be stored in an in-memory data structure and associated with a logical address, which in one embodiment is the object identifier. This logical address may be used to access the data during read requests, as discussed in detail above. In some embodiments, transmitting the tag to the PSM comprises a DMA read from the PSM to the processor memory. This read may be performed in response to receiving the write completion indication.

In some embodiments, once the PSM receives the tag from the processor it may transmit a tag transmission done notification back to the processor. This may indicate to the processor that the tag was received at the PSM prior to continuing to block 316.

Finally, at block 316, the processor transmits a system write completion to the client. The processor may transmit this system write completion once it has transmitted a tag to each of the PSMs that have received data. The system write indication may notify the client that the write process is complete and that the data is now available in the PSMs.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for reading data from persistent storage module ("PSM") in a communication fabric, the method comprising:
    receiving a persistent storage module ("PSM") read request from a client at a processor, wherein the PSM read request comprises a logical address for data;
    identifying, at the processor, a PSM associated with the logical address;
    transmitting the PSM read request to the PSM associated with the logical address;
    writing the data from the PSM to the client, wherein writing the data comprises transmitting the data through a down stream input/output ("IO") tier switch associated with the client, wherein the down stream IO tier switch is one of a plurality of tiers of switches of a mesh communication fabric, wherein each of the tiers of switches is coupled to one or more clients, wherein the processor can communicate with any of the one or more clients via any of the tiers of switches over the mesh communication fabric, wherein the plurality of tiers of switches comprises hub tier switches and input/output ("IO") tier switches;
    transmitting a read completion from the PSM to the processor, wherein the read completion is transmitted through the down stream IO tier switch following the data; and
    transmitting the read completion from the processor to the client.

2. The method of claim 1, wherein the communication fabric is a PCIe fabric comprising a fully-connected mesh topology.

3. The method of claim 1, wherein writing the data from the PSM to the client comprises a direct memory access ("DMA") write.

4. The method of claim 1, wherein transmitting the PSM read request to the PSM comprises:
  transmitting a doorbell from the processor to the PSM; and
  reading the read request at the PSM from a memory associated with the processor using a direct memory access ("DMA") read.

5. The method of claim 1, wherein the read request is routed to the down stream IO tier switch based on a memory address rather than an endpoint address.

6. A non-transitory computer readable storage medium comprising instructions embodied therein for reading data from a persistent storage module ("PSM") in a communication fabric, the instructions comprising:
  receiving a PSM read request from a client at a processor, wherein the PSM read request comprises a logical address for data;
  identifying, at the processor, a PSM associated with the logical address;
  transmitting the PSM read request to the PSM associated with the logical address;
  writing the data from the PSM to the client, wherein writing the data comprises transmitting the data through a down stream input/output ("IO") tier switch associated with the client, wherein the down stream IO tier switch is one of a plurality of tiers of switches of a mesh communication fabric, wherein each of the tiers of switches is coupled to one or more clients, wherein the processor can communicate with any of the one or more clients via any of the tiers of switches over the mesh communication fabric, wherein the plurality of tiers of switches comprises hub tier switches and input/output ("IO") tier switches;
  transmitting a read completion from the PSM to the processor, wherein the read completion is transmitted through the down stream IO tier switch following the data; and
  transmitting the read completion from the processor to the client.

7. The non-transitory computer readable storage medium of claim 6, wherein the communication fabric is a PCIe fabric comprising a fully-connected mesh topology.

8. The non-transitory computer readable storage medium of claim 6, wherein writing the data from the PSM to the client comprises a direct memory access ("DMA") write.

9. The non-transitory computer readable storage medium of claim 6, wherein transmitting the PSM read request to the PSM comprises:
  transmitting a doorbell from the processor to the PSM; and
  reading the read request at the PSM from a memory associated with the processor using a direct memory access ("DMA") read.

10. A system for reading data from a persistent storage module ("PSM") in a communication fabric, the system comprising a processor for:
  receiving a PSM read request from a client at the processor, wherein the PSM read request comprises a logical address for data;
  identifying, at the processor, a PSM associated with the logical address;
  transmitting the PSM read request to the PSM associated with the logical address;
  writing the data from the PSM to the client, wherein writing the data comprises transmitting the data through a down stream input/output ("IO") tier switch associated with the client, wherein the down stream IO tier switch is one of a plurality of tiers of switches of a mesh communication fabric, wherein each of the tiers of switches is coupled to one or more clients, wherein the processor can communicate with any of the one or more clients via any of the tiers of switches over the mesh communication fabric, wherein the plurality of tiers of switches comprises hub tier switches and input/output ("IO") tier switches;
  transmitting a read completion from the PSM to the processor, wherein the read completion is transmitted through the down stream IO tier switch following the data; and
  transmitting the read completion from the processor to the client.

11. The system of claim 10, wherein the communication fabric is a PCIe fabric comprising a fully-connected mesh topology.

12. The system of claim 10, wherein writing the data from the PSM to the client comprises a direct memory access ("DMA") write.

13. The system of claim 10, wherein transmitting the PSM read request to the PSM comprises:
  transmitting a doorbell from the processor to the PSM; and
  reading the read request at the PSM from a memory associated with the processor using a direct memory access ("DMA") read.

* * * * *